(No Model.)

M. M. HOOTON.
RAKING MECHANISM FOR HARVESTERS.

No. 255,510. Patented Mar. 28, 1882.

Attest,
W. H. H. Knight,
Wm. A. Blackstock.

Inventor,
Marsena M. Hooton,
by Hill & Church,
His Atty.

UNITED STATES PATENT OFFICE.

MARSENA M. HOOTON, OF CENTRALIA, ASSIGNOR TO SUSAN A. HOOTON, OF CLINTON COUNTY, ILLINOIS.

RAKING MECHANISM FOR HARVESTERS.

SPECIFICATION forming part of Letters Patent No. 255,510, dated March 28, 1882.

Application filed March 23, 1881. (No model.)

*To all whom it may concern:*

Be it known that I, MARSENA M. HOOTON, of Centralia, in the county of Marion and State of Illinois, have invented certain new and useful Improvements in Raking Mechanism for Harvesters and Harvester-Binders; and I do hereby declare the following to be a full, clear, and exact description of the same, reference being had to the accompanying drawings, forming part of this specification, in which—

Figure 1:
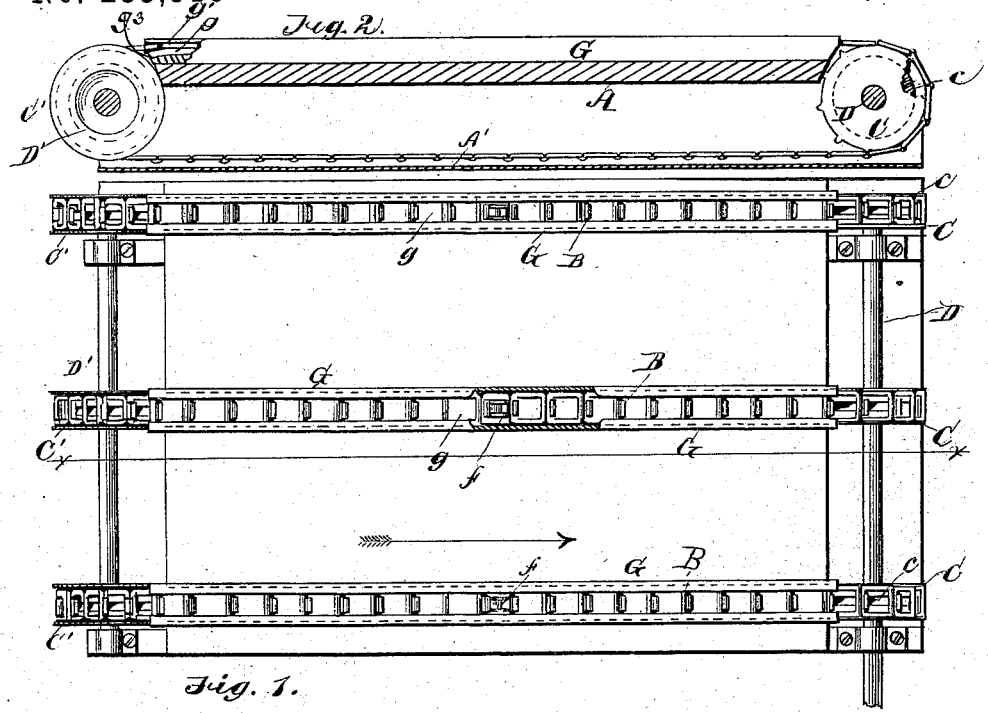
Figure 3:
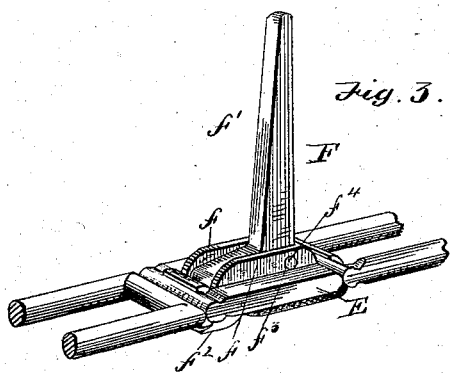
Figure 5:
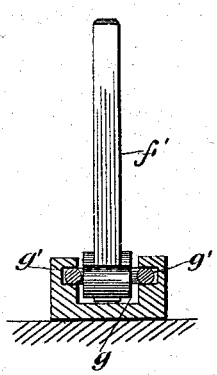
Figure 4:
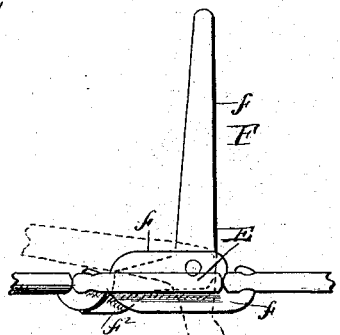

Figure 1 is a top plan view of my invention. Fig. 2 represents a longitudinal section of the same, taken on the line $x\ x$, Fig. 1. Fig. 3 is a perspective view of one of the rake-teeth and its link; Fig. 4, a side view of the same, and Fig. 5 a view showing the construction of the guide through which one of the endless chains passes.

Similar letters of reference in the several figures denote the same parts.

My invention has for its object to provide improved raking mechanism for harvesters and harvester-binders; and to this end it consists in certain novel devices and combinations of devices, which I will now proceed to describe.

In the drawings, A represents the grain-platform of a harvester or harvester-binder.

B B B are endless chains running over pulleys or sprocket-wheels C C C and C' C' C', mounted respectively on shafts D and D' at opposite ends of the platform, as shown in Figs. 1 and 2. These chains may be of any suitable construction; but by preference I employ what is known as the "Ewart" chain. Each of the chains has inserted in it a link, E, having means of connection to the adjoining links the same as the other links of the chain, but, unlike the other links, carrying a rake-tooth, F. The link E is provided at each side of the opening through it with stout flanges $f\ f$, which project above and below the faces of the link, as shown in Fig. 4.

The rake-tooth F is constructed with a long arm or body, $f'$, and a short arm or heel, $f^2$, and it is pivoted at $f^3$ on a pivot, $f^4$, which passes through the upper part of the flanges $f\ f$, as shown. The said flanges $f\ f$, by reason of their projection above and below the link, materially strengthen the link, besides affording lateral support to the tooth when raking and preventing binding when swinging on its pivot.

The long arm or body of the tooth is preferably made slightly tapering toward its point, while the short arm or heel is curved or bent and formed to fit the bar of the adjoining link when the tooth is in raking position, so as not to project much below said bar.

The platform is provided with metal guides G G G for the several endless chains, such guides being formed with a groove, $g$, deep enough to allow the chains to move slightly below the top surface of the guides, and with lateral grooves $g'\ g'$ for accommodating the lateral edges of the chains and holding them down properly in position.

Each of the sprocket-wheels is provided with a deep peripheral groove, $c$, for the accommodation of the heel of the tooth when passing over it. The sprocket-wheels or pulleys C' C' C' preferably run loose on their shaft, while the wheels C C C are fixed to their shaft, the latter being the shaft to which the power is applied to drive the raking mechanism.

The guides G G G may project above the surface of the platform, as shown, or they may be countersunk in the platform flush with its surface, if desired.

In the operation of the device, power being applied to the shaft D, motion is imparted to all the endless belts simultaneously, and they move in the direction indicated by the arrow. As the rake-teeth travel along beneath the platform their long arms lie folded down against the chains and run in contact with the bottom A' of the platform; but as they rise up over the sprocket-wheels or pulleys C' C' C' their heels strike the bottom of the guides at $g^3$ and their long arms are thrown upward, so that when the links E, bearing the teeth, enter the lateral grooves $g'\ g'$ of the guides the heels of the teeth bear upon the bottom of groove $g$ and hold the teeth up firmly in vertical position. Passing along the length of the platform, the teeth gather the cut grain into a bundle and discharge it from the end of the platform, or else deliver it to suitable binding mechanism located at the end of the platform, as the case may be. As the rake-teeth pass over the sprocket-wheels C C C their heels enter the deep peripheral grooves in such wheels and their long arms drop down in position for the return movement, as before. In order to insure the proper entry of the links into the guides, the lateral slots of the latter at their ends are slightly enlarged or tapered, as shown in Fig. 2, so as to direct the links and prevent them from catching by any possibility.

Where the raking mechanism is employed in connection with a binding mechanism the two mechanisms are so timed in their movements as that the rake-teeth shall gather the grain and compress it into a bundle and deliver it to the binding mechanism before the latter begins to apply the band.

If desired, two or more of the tooth-carrying links may be inserted in each of the endless chains; but in such case it will be necessary to give the chains a slower movement in order that the teeth may not sweep off the grain before a sufficient quantity has fallen on the platform to form a bundle.

Having thus described my invention, I claim as new—

1. The tooth F, constructed as described, in combination with the link E, having the flanges $ff$, between which the tooth is pivoted, said flanges extending both above and below the body of the link and serving to strengthen the same and also to support the tooth laterally, substantially as described.

2. The combination, with the link E, of the tooth F, pivoted to said link, as described, and having its shorter arm curved, so as to fit the bar of the adjoining link when the tooth is in raised position, substantially as described.

MARSENA M. HOOTON.

Witnesses:
WM. A. BLACKSTOCK,
JOSEPH FORREST.